J. R. GLYNN.
NUT LOCK.
APPLICATION FILED JULY 2, 1913.
1,139,029.
Patented May 11, 1915.
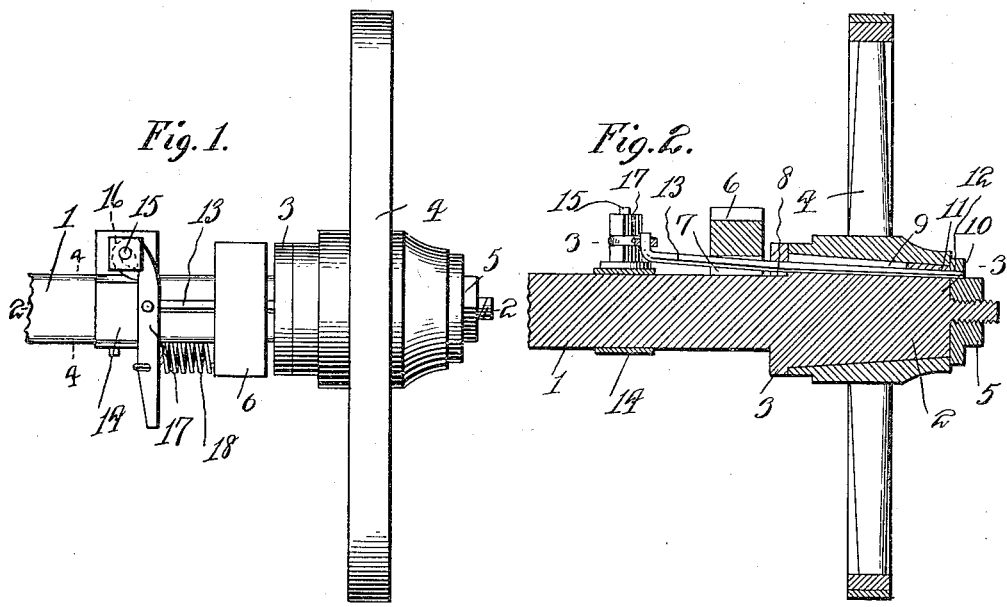
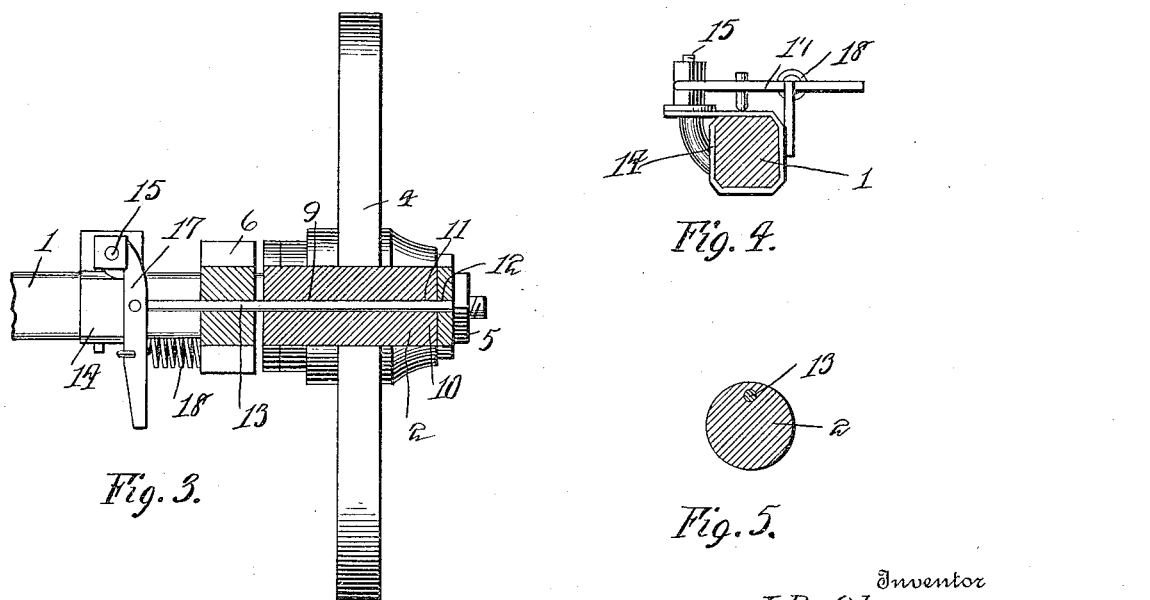
Witnesses
J H Taylor
Inventor
J. R. Glynn.
By Victor J. Evans
Attorney

UNITED STATES PATENT OFFICE.

JAMES R. GLYNN, OF SOUTH OMAHA, NEBRASKA.

NUT-LOCK.

1,139,029.        Specification of Letters Patent.      Patented May 11, 1915.

Application filed July 2, 1913. Serial No. 777,020.

*To all whom it may concern:*

Be it known that I, JAMES R. GLYNN, a citizen of the United States, residing at South Omaha, in the county of Douglas and State of Nebraska, have invented new and useful Improvements in Nut-Locks, of which the following is a specification.

The present invention relates to simple but effective means for sustaining a nut upon a bolt without danger of the separation of the same by vibration or other accidental causes.

The invention is primarily directed for securing a carriage nut upon an axle spindle, and resides in the construction, combination and arrangement of parts set forth in the following specification and falling within the scope of the appended claims.

In the drawing there has been illustrated a simple and preferred embodiment of the improvement reduced to practice, and in which drawing:

Figure 1 is a view in plan illustrating the manner of arranging my improvement upon the axle of a vehicle wheel. Fig. 2 is a central longitudinal sectional view on the line 2—2 of Fig. 1, Fig. 3 is a horizontal sectional view on the line 3—3 of Fig. 2, Fig. 4 is a transverse sectional view on the line 4—4 of Fig. 1, and Fig. 5 is a detail transverse sectional view taken through the spindle of the axle.

In the accompanying drawing, the numeral 1 designates an ordinary vehicle axle having its ends provided with the usual spindles 2, only one of which being shown in the drawing. The usual collar 3 is arranged at the juncture of the axle with its spindle, and journaled upon said spindle is the hub of a vehicle wheel 4. The threaded end of the spindle is adapted to receive the ordinary flanged vehicle nut 5 which sustains the wheel upon the spindle.

The numeral 6 designates a block arranged upon the axle 1. This block may support the springs for the body or box of the vehicle, and is provided with an opening 7 arranged centrally of the axle and which communicates with a similar opening 8 in the collar 3 and the opening 8 communicates with the longitudinally extending depression 9 provided in the upper face of the spindle 2. The depression 9 does not extend the entire length of the spindle, but terminates a suitable distance from its end or shoulder provided with the threaded extension upon which the nut 5 is received. The end or shoulder of the spindle, which may be designated by the numeral 10, is provided with a longitudinally arranged passage 11 forming an extension of the depression 9, and the nut 5 has its flange provided with one or more openings or depressions 12 which are adapted to register with the passage 11 when the nut is screwed home upon the threaded end of the spindle.

Arranged upon the upper face of the axle and passing through the openings 7 and 8, and the depression 9 as well as the passage 11, is a lock bar 13. This bar does not project above the face of the spindle which is provided with the depression 9 so as not to interfere with free rotation of the wheel upon the spindle, and so the said depression 9 is adapted to serve as a lubricant chamber wherein a proper amount of lubricant is delivered to the bore of the hub of the wheel, as well as to the lock bar 13. Arranged upon the axle, a suitable distance away from the block 6 is a clamp 14 which may be in the nature of a split band and which has its end that is arranged upon the top of the axle extending a suitable distance to one side of the axle and the opposite end of the band provided with a threaded member 15 which passes through a suitable opening in the first mentioned extension. Suitable washers and nuts are arranged upon the threaded member 15, and arranged upon the member 15 between certain of said washers is the eye 16 of a lever 17. The lever 17 is formed with an opening and the inner end of the lock bar 13 is upset or arranged angularly and passes through the said opening.

With an arrangement as above described, it will be noted that after the wheel has been arranged upon the spindle of the axle and the nut applied to the threaded extremity of the spindle so that its opening or one of its openings or depressions register with the passage 11, the lever is swung to permit the longitudinal movement of the lock bar and to have its end received within the said opening or depression in the flange of the nut 5. Ordinarily the frictional engagement of the lock bar with the opening or depression of the flange of the nut is sufficient to prevent the accidental movement of the lever 17, and as a consequence any longitudinal movement of the lock bar, but, if desired, and as illustrated in Fig. 1 of the drawings, a spring 18 may be arranged between the lever and the block 6 to normally force the lever toward the block and so sustain the engaging end of the lock bar projected beyond the end of the spindle and over the threaded depression thereof. Again, and as illustrated in Fig. 2 of the drawings, a catch member, in the nature of a compressible spring 19 may normally contact with the inner edge of the lever or with the upturned end of the lock bar for preventing accidental movement of either the lever or lock bar.

From the above description, taken in connection with the accompanying drawing, the simplicity of the device, as well as the advantages thereof will, it is thought, be perfectly apparent to those skilled in the art to which such inventions appertain without further detailed description.

Having thus described the invention, what I claim is:

1. In combination, an axle, a clamp upon the axle, a lever pivotally connected with the clamp, a block upon the axle, a spring between the block and the lever, and a nut engaging lock bar passing through the block and guided thereby.

2. The combination with an axle having a spindle and the hub of a wheel arranged upon the spindle, and a nut for sustaining the wheel upon the spindle, the said spindle having a passage and the nut having a depression which registers with the passage, of a clamp surrounding the axle, said clamp including a split band having a threaded member which is adapted to pass through an opening in one end of the band, a lever arranged upon the threaded member, means for sustaining the lever upon the threaded member, a block upon the axle having an opening which registers with the passage in the spindle, a locking bar normally having one of its ends arranged in the nut and passing through the opening in the block, a connection between the said bar and lever, a spring connected with the lever and block and exerting a tension between the said lever and block.

In testimony whereof I affix my signature in presence of two witnesses.

JAMES R. GLYNN.

Witnesses:
 MARIE HYNEK,
 FREDERICK O. BECK.

Copies of this patent may be obtained for five cents each, by addressing the "Commissioner of Patents, Washington, D. C."